3,470,155
N-DIHYDROPYRANYLMETHYL-5-SULFAMOYL-ANTHRANILIC ACID DERIVATIVES

Joseph Weinstock, Phoenixville, Pa., assignor to Smith Kline & French Laboratories, Philadelphia, Pa., a corporation of Pennsylvania
No Drawing. Filed Nov. 16, 1965, Ser. No. 508,162
Int. Cl. C07d 7/10; A01k 27/00
U.S. Cl. 260—239.6       6 Claims This invention relates to new N-dihydropyranylmethyl-5-sulfamoylanthranilic acid derivatives having diuretic activity. The compounds of this invention are also useful in treating hypertension.

The new compounds of this invention are represented by the following formula:

FORMULA I

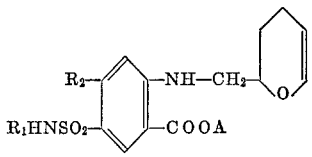

in which:

A is hydrogen or lower alkyl;
$R_1$ is hydrogen or lower alkyl;
$R_2$ is chloro, bromo, fluoro or trifluoromethyl.

Preferred compounds of this invention are represented by the following formula:

FORMULA II

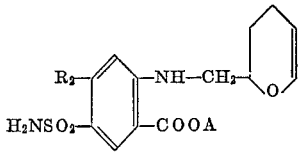

in which:

A is hydrogen or methyl and
$R_2$ is chloro or trifluoromethyl.

The term "lower alkyl" where used herein denotes groups having 1 to 6, preferably 1 to 4, carbon atoms.

Also included in this invention are carboxylic acid salts of the anthranilic acids of Formula I prepared by reacting the carboxylic acid with an inorganic or organic base such as an alkali metal hydroxide, for example, sodium or potassium hydroxide, ammonia or benzylamine.

The compounds of this invention are prepared as follows:

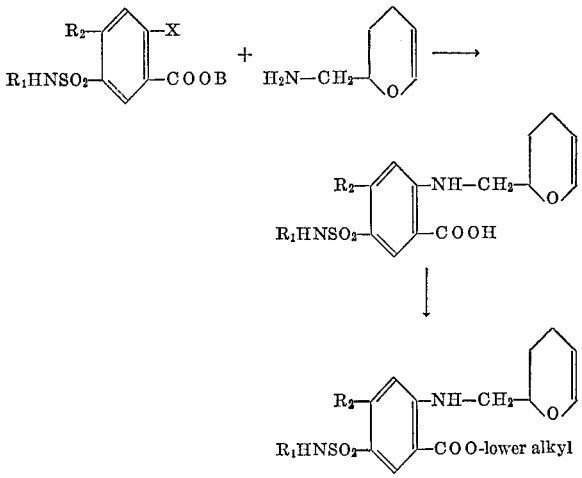

The terms $R_1$, $R_2$ and $R_3$ are as defined above; B is hydrogen or lower alkyl and X is chloro, bromo or fluoro chosen so that when $R_2$ is chloro, X is chloro or fluoro; when $R_2$ is bromo, X is chloro, bromo or fluoro and when $R_2$ is fluoro, X is fluoro.

According to the above procedure, a 2-halo-4-$R_2$-5-sulfamoylbenzoic acid or, preferably, a lower alkyl ester thereof, preferably, the methyl ester, is reacted with 2-aminomethyl-3,4-dihydro-2H-pyran. The reaction is carried out at elevated temperature in a suitable solvent such as methoxyethanol or the dimethyl ether of diethylene glycol. An excess of the amine is used, in particular, where a benzoic acid is used. In the case of the lower alkyl esters, a suitable less reactive organic base such as triethylamine may be employed in the reaction as an acid acceptor.

The anthranilic acid esters of this invention are prepared by conversion of the anthranilic acid to the acid chloride with thionyl chloride in chloroform and subsequent alcoholysis of the acid chloride.

The 2-halo-4-$R_2$-5-sulfamoylbenzoic acid and lower alkyl ester starting materials are either known to the art or are prepared by procedures I or II as follows:

I.

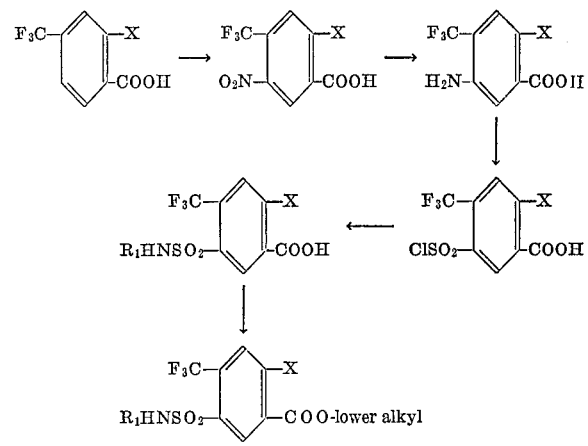

The term $R_1$ is as defined above and X is chloro, bromo or fluoro.

II.

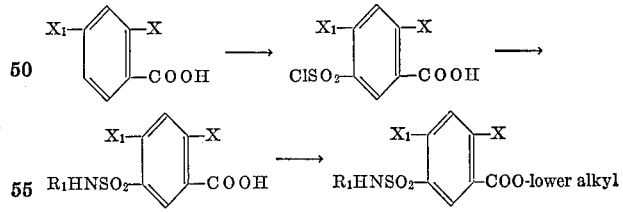

The term $R_1$ is as defined above and $X_1$ and X are chloro, bromo or fluoro chosen so that when $X_1$ is chloro, X is chloro or fluoro; when $X_1$ is bromo, X is chloro, bromo or fluoro and when $X_1$ is fluoro, X is fluoro.

According to procedure I a 2-halo-4-trifluoromethylbenzoic acid is treated with fuming sulfuric acid and fuming nitric acid to give a 2-halo-5-nitro-4-trifluoromethylbenzoic acid. The nitro group is reduced by treating with a chemical reducing agent such as iron powder in aqueous ammonium chloride solution to give a 5-amino-2-halo-4-trifluoromethylbenzoic acid. Treating this amino compound with concentrated hydrochloric acid and sodium nitrite followed by a solution of sulfur dioxide in acetic acid containing cuprous or cupric chloride and treating the resulting 5-chlorosulfonyl compound with ammonium hydroxide or with an alkylamine gives a 2-halo- 5-sulfamoyl-4-trifluoromethylbenzoic acid. Esterifying the benzoic acid by heating with an excess of a lower alkanol in the presence of a mineral acid such as sulfuric acid gives the lower alkyl ester.

According to procedure II, a 2,4-dihalobenzoic acid is heated with an excess of chlorosulfonic acid and the resulting 5-chlorosulfonyl compound is treated with ammonium hydroxide or with an alkylamine to give a 2,4-dihalo-5-sulfamoylbenzoic acid. The lower alkyl ester is prepared by heating the benzoic acid with an excess of a lower alkanol in the presence of a mineral acid such as sulfuric acid.

The following examples are not limiting but are illustrative of the compounds of this invention.

Example 1

To a suspension of 9.94 g. of methyl 2,4-dichlorosulfamoyl benzoate in 28 ml. of the dimethyl ether of diethylene glycol is added 28 ml. of triethylamine and 5.6 ml. of 2-aminomethyl-3,4-dihydro-2H-pyran (Aldrich Catalog 12, 1966). The mixture is refluxed with stirring for three hours, then chilled and diluted with 150 ml. of ether and 150 ml. of water. To this mixture is added 20 ml. of concentrated hydrochloric acid. The mixture is shaken and the ether layer is separated, extracted with 1 N hydrochloric acid solution, then washed with water and saturated sodium hydroxide solution. The organic solution is then extracted with 0.5 N potassium chloride solution. The aqueous potassium hydroxide extracts are allowed to stand at room temperature for about two days.

Ethyl acetate is added to the solution and the resulting mixture is acidified to pH 4 with acetic acid. The ethyl acetate layer is separated, washed with water and extracted with saturated sodium bicarbonate solution. The basic extracts are acidified to pH 5 with acetic acid. The precipitate is collected by filtration then dissolved in saturated sodium bicarbonate solution. The solution is treated with charcoal, filtered and then reacidified to pH 5. The precipitate is collected by filtration and recrystallized from ethyl acetate to give 4-chloro-5-sulfamoyl-N-[2-(3,4-dihydro-2H-pyranyl)methyl]-anthranilic acid.

Example 2

To a stirred refluxing suspension of 5.0 g. of 4-chloro-5 - sulfamoyl-N-[2-(3,4-dihydro-2H-pyranyl)methyl]-anthranilic acid (prepared as in Example 1) in 25 ml. of dry benzene and 2 drops of pyridine under nitrogen is added 5.35 g. of thionyl chloride. The mixture is refluxed for 30 minutes and filtered hot. Hexane is added and the mixture is chilled and filtered to give the anthranilic acid chloride. 4 - chloro - 5-sulfamoyl-N-[2-(3,4-dihydro-2H-pyranyl)methyl]anthranilic acid chloride (4.4 g.) is added to 100 ml. of absoltue methanol and the mixture is heated on a steam bath for 30 minutes. Cooling and filtering gives methyl 4-chloro-5-sulfamoyl-N-[2-(3,4-dihydro-2H-pyranyl)methyl]anthranilate.

In the same manner using ethanol, n-butanol and n-hexanol in place of methanol in the above procedure the corresponding ethyl, n-butyl and n-hexyl esters are obtained.

Example 3

Five grams of 2-bromo-4-trifluoromethylbenzoic acid is added with stirring to 31 g. of fuming 30% sulfuric acid. To this mixture is added dropwise 7.7 g. of fuming nitric acid keeping the temperature below 70° C. The mixture is heated with stirring on a steam bath for two hours, then treated with a large excess of ice water and filtered to give 2-bromo-5-nitro-4-trifluoromethylbenzoic acid.

To a mixture of 4.8 g. of iron powder and a solution of 2.5 g. of ammonium chloride in 40 ml. of water at 50° C. is added 4.5 g. of 2-bromo-5-nitro-4-trifluoromethylbenzoic acid. The resulting mixture is heated on a steam bath with stirring for three hours, then treated with 10% sodium carbonate, filtered, neutralized with concentrated hydrochloric acid, allowed to stand, cooled and filtered to give 5-amino-2-bromo-4-trifluoromethylbenzoic acid.

To a suspension of 4.3 g. of 5-amino-2-bromo-4-trifluoromethylbenzoic acid in 10 ml. of concentrated hydrochloric acid at 6° C. is added slowly with stirring a solution of 1.14 g. of sodium nitrite in 60 ml. of water. The resulting cold mixture is poured with stirring into 15 ml. of acetic acid containing 0.2 g. of cuprous chloride. The solid material is filtered off, washed with water and then added with stirring to an excess of ammonium hydroxide. After stirring at room temperature for two hours, the solution is made acid with concentrated hydrochloric acid and the 2-bromo-5-sulfamoyl-4-trifluoromethylbenzoic acid is filtered off, washed with water and dried.

The above prepared 2-bromo-5-sulfamoyl-4-trifluoromethylbenzoic acid in cold methanol solution is treated with 1.5 ml. of concentrated sulfuric acid. The mixture is heated at reflux for three hours. Concentrating the mixture, cooling and filtering gives methyl 2-bromo-5-sulfamoyl-4-trifluoromethllbenzoate.

The above prepared ester (3.2 g.) in 7 ml. of the dimethyl ether of diethylene glycol is refluxed for three hours with 7 ml. of triethylamine and 1.4 ml. of 2-aminomethyl-3,4-dihydro-2H-pyran. Working up as in Example 1 gives 5-sulfamoyl-4-trifluoromethyl-N-[2-(3,4-dihydro-2H-pyranyl)methyl]anthranilic acid.

Treating a sample of this acid with an equimolar amount of potassium hydroxide in water gives, after evaporating the water in vacuo, the potassium salt of 5-sulfamoyl - 4 - trifluoromethyl - N-[2-(3,4-dihydro-2H-pyranyl)-methyl]anthranilic acid.

Example 4

A mixture of 16.2 g. of 2,4-difluorobenzoic acid and 58 g. of chlorosulfonic acid is heated to 160° C., then cooled and poured into ice water. Filtering gives 2,4-difluoro-5-chlorosulfonylbenzoic acid. Treating this 5-chlorosulfonyl compound with a cold aqueous methanol solution of methylamine, then concentrating the mixture in vacuo, acidifying with hydrochloric acid and filtering gives 2,4-difluoro-5-methylsulfamoylbenzoic acid.

Ten grams of 2-aminomethyl-3,4-dihydro-2H-pyran is added to 4.8 g. of 2,4-difluoro-5-methylsulfamoylbenzoic acid in 30 ml. of 2-methoxyethanol. The resulting mixture is heated at reflux under nitrogen with stirring for five hours, then poured into 150 ml. of 1 N hydrochloric acid and chilled. The precipitate is collected by filtration, then dissolved in saturated sodium bicarbonate solution. The solution is treated with charcoal, filtered and acidified with pH 4 to 4.5. The precipitate is collected by filtration to give 4-fluoro-5-methylsulfamoyl-N-[2-(3,4-dihydro-2H-pyranyl)methyl]-anthranilic acid.

Example 5

A cold methanol solution of 5.0 g. of 2-bromo-5-(n-butyl)sulfamoyl-4-trifluoromethylbenzoic acid (prepared as in Example 3 using an excess of n-butylamine in ethanol in place of ammonium hydroxide) is treated with 2 ml. of concentrated sulfuric acid. The mixture is heated at reflux for three hours, then concentrated, cooled and filtered to give methyl 2-bromo-5-(n-butyl)sulfamoyl-4-trifluoromethylbenzoate.

Refluxing this ester with 3.0 ml. of 2-(3,4-dihydro-2H-pyranyl)methylamine in 20 ml. of the dimethyl ether of diethylene glycol and 20 ml. of triethylamine and working up as in Example 1 gives 5-(n-butyl)sulfamoyl-4-trifluoromethyl-N-[2-(3,4-dihydro-2H-pyranyl)methyl] - anthranilic acid.

Using 2-bromo-5-(n-hexyl)sulfamoyl-4-trifluoromethylbenzoic acid (prepared as in Example 3 using an excess of n-hexylamine in place of ammonium hydroxide) in the above procedure gives 5-(n-hexyl)sulfamoyl-4-trifluoromethyl - N - [2-(3,4-dihydro-2H-pyranyl)methyl]-anthranilic acid.

Example 6

According to the procedure of Example 1, using 13 g. of methyl 2,4-dibromo-5-sulfamoylbenzoate (prepared from 2,4-dibromo-5-sulfamoylbenzoic acid by the procedure of Example 5) in 28 ml. of the dimethyl ether of diethylene glycol, 28 ml. of triethylamine and 5.6 ml. of 2-(3,4-dihydro-2H-pyranyl)methylamine, 4-bromo-5-sulfamoyl - N - [2-(3,4-dihydro-2H-pyranyl)methyl]anthranilic acid is obtained.

Treating a sample of the above prepared anthranilic acid with an equimolar amount of benzylamine in methanol at room temperature gives, after evaporating the methanol in vacuo, the benzylamine salt of 4-bromo-5-sulfamoyl - N - [2-(3,4-dihydro-2H-pyranyl)methyl]-anthranilic acid.

What is claimed is:

1. A compound of the formula:

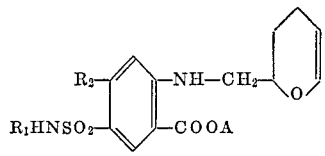

in which:
   A is hydrogen or lower alkyl;
   $R_1$ is hydrogen or lower alkyl and
   $R_2$ is chloro, bromo, fluoro or trifluoromethyl or,
      when A is hydrogen, a pharmaceutically acceptable carboxylic acid salt thereof.

2. A compound according to claim 1 in which A is hydrogen.

3. A compound according to claim 1 in which A is methyl.

4. A compound according to claim 1 in which A is hydrogen, $R_1$ is hydrogen and $R_2$ is chloro or trifluoromethyl.

5. A compound according to claim 1 in which A is hydrogen, $R_1$ is hydrogen and $R_2$ is chloro.

6. A compound according to claim 1 in which A is hydrogen, $R_1$ is hydrogen and $R_2$ is trifluoromethyl.

No references cited.

JOHN D. RANDOLPH, Primary Examiner

HARRY I. MOATZ, Assistant Examiner

U.S. Cl. X.R.

260—470, 515, 518; 424—229